Jan. 13, 1970 J. PETTAVEL ET AL 3,489,905

PHOTOELECTRIC ARRANGEMENT FOR INDICATING THE POSITION OF GRADUATIONS IN WHICH A CONJUGATE RELATIONSHIP IS MAINTAINED BETWEEN ILLUMINATING AND DETECTED RAYS

Filed Aug. 9, 1966 11 Sheets-Sheet 1

INVENTORS

JACQUES PETTAVEL
MAURICE KOULICOVITCH

BY Young & Thompson
ATTYS.

INVENTORS
JACQUES PETTAVEL
MAURICE KOULICOVITCH
BY Young & Thompson
ATTYS.

INVENTORS
JACQUES PETTAVEL
MAURICE KOULICOVITCH
BY Young + Thompson
ATTYS.

INVENTORS
JACQUES PETTAVEL
MAURICE KOULICOVITCH
BY Young & Thompson
ATTYS.

Jan. 13, 1970 J. PETTAVEL ET AL 3,489,905
PHOTOELECTRIC ARRANGEMENT FOR INDICATING THE POSITION OF GRADUATIONS IN WHICH A CONJUGATE RELATIONSHIP IS MAINTAINED BETWEEN ILLUMINATING AND DETECTED RAYS
Filed Aug. 9, 1966 11 Sheets-Sheet 5

INVENTORS

JACQUES PETTAVEL
MAURICE KOULICOVITCH

BY Young & Thompson
ATTYS

INVENTORS
JACQUES PETTAVEL
MAURICE KOULICOVITCH
BY Young + Thompson
ATTYS.

PHOTOELECTRIC ARRANGEMENT FOR INDICATING THE POSITION OF GRADUATIONS IN WHICH A CONJUGATE RELATIONSHIP IS MAINTAINED BETWEEN ILLUMINATING AND DETECTED RAYS

Filed Aug. 9, 1966 11 Sheets-Sheet 7

INVENTORS
JACQUES PETTAVEL
MAURICE KOULICOVITCH
BY Young & Thompson
ATTYS.

INVENTORS
JACQUES PETTAVEL
MAURICE KOULICOVITCH
BY Young + Thompson
ATTYS.

INVENTORS

JACQUES PETTAVEL
MAURICE KOULICOVITCH

BY Young & Thompson
ATTYS.

INVENTORS
JACQUES PETTAVEL
MAURICE KOULICOVITCH
BY Young & Thompson
ATTYS.

INVENTORS
JACQUES PETTAVEL
MAURICE KOULICOVITCH
BY Young + Thompson
ATTYS.

United States Patent Office 3,489,905
Patented Jan. 13, 1970

3,489,905

PHOTOELECTRIC ARRANGEMENT FOR INDICATING THE POSITION OF GRADUATIONS IN WHICH A CONJUGATE RELATIONSHIP IS MAINTAINED BETWEEN ILLUMINATING AND DETECTED RAYS

Jacques Pettavel and Maurice Koulicovitch, Geneva, Switzerland, assignors to Societe Genevoise d'Instruments de Physique, Geneva, Switzerland, a corporation of Switzerland Filed Aug. 9, 1966, Ser. No. 571,286
Claims priority, application Switzerland, Sept. 7, 1965, 12,466/65
Int. Cl. H01j *39/12, 3/14, 5/16*
U.S. Cl. 250—216 4 Claims

ABSTRACT OF THE DISCLOSURE

A photoelectric arrangement for indicating the position or graduations, comprises a light source, a deflector to oscillate a light beam from the source so as to illuminate graduations on either side of a central optical axis, and a photoelectric cell arranged to receive the light beam reflected from the graduations by way of the deflector. The light source and photoelectric cell are mounted in unitary assembly for simultaneous transverse movement under the influence of a wedge and screw arrangement.

The present invention has for its object a high precision photo-electric microscope for the reading of the graduations of a precision ruler which comprises an optical sighting device, a deflector which oscillates periodically an incident pencil of rays on either side of a center position, as well as a photo-electric cell receiving the pencil of rays reflected by the surface of the precision ruler and controlling an electronic indication device of the relative position between one mark of the graduations of the precision ruler and the center position of the optical axis.

Such photo-electric microscopes are known and described for example in the U.K. Patent No. 686,274 and work satisfactorily only when the amplitude of the oscillation of the incident rays is sufficient with respect to the value of the distances to be measured so that the portion of the scanning sinusoid used may be taken as a straight line. In fact, it is only when this requirement is satisfied that a good proportionality between the position of the sighted mark and the reading of the indicating instrument can be obtained.

On the contrary, when the distance to be measured is relatively great with respect to the amplitude of the scanning, the displacement of the indicating member is no longer linearly proportional to the distance between the sighting axis and the mark, which presents in certain cases drawbacks.

To remedy these drawbacks, photo-electric microscopes have been developed and described, for example in the U.S. Patent No. 3,042,804. These photo-electric microscopes comprise an analogic device translating, according to a linear function, the distance between the optical axis of the sighting device and one of the graduations. These photo-electric microscopes are however complex and therefore disadvantageous.

Further, these different photo-electric microscopes present drawbacks, particularly a limitation of their precision, due on the one hand to the scanning of the photo-electric cell by the reflected spot and on the other hand to the difference of illumination due to the scanning of the incident pencil of rays on the objective.

The present invention has for its object a photo-electric microscope tending to obviate the above drawbacks and which is characterized by the fact that the reflected pencil of rays is also subjected to the action of the deflector and that the ratio of the lengths of the optical paths of the incident and reflected pencils of rays with respect to the deflector is such that the spot received by the photo-electric cell is immobile.

The attached drawings show schematically and by way of example several embodiments of the photo-electric microscope according to the invention.

FIGURES 1 to 4 are diagrams of different embodiments of the photo-electric microscope.

Figure 5:
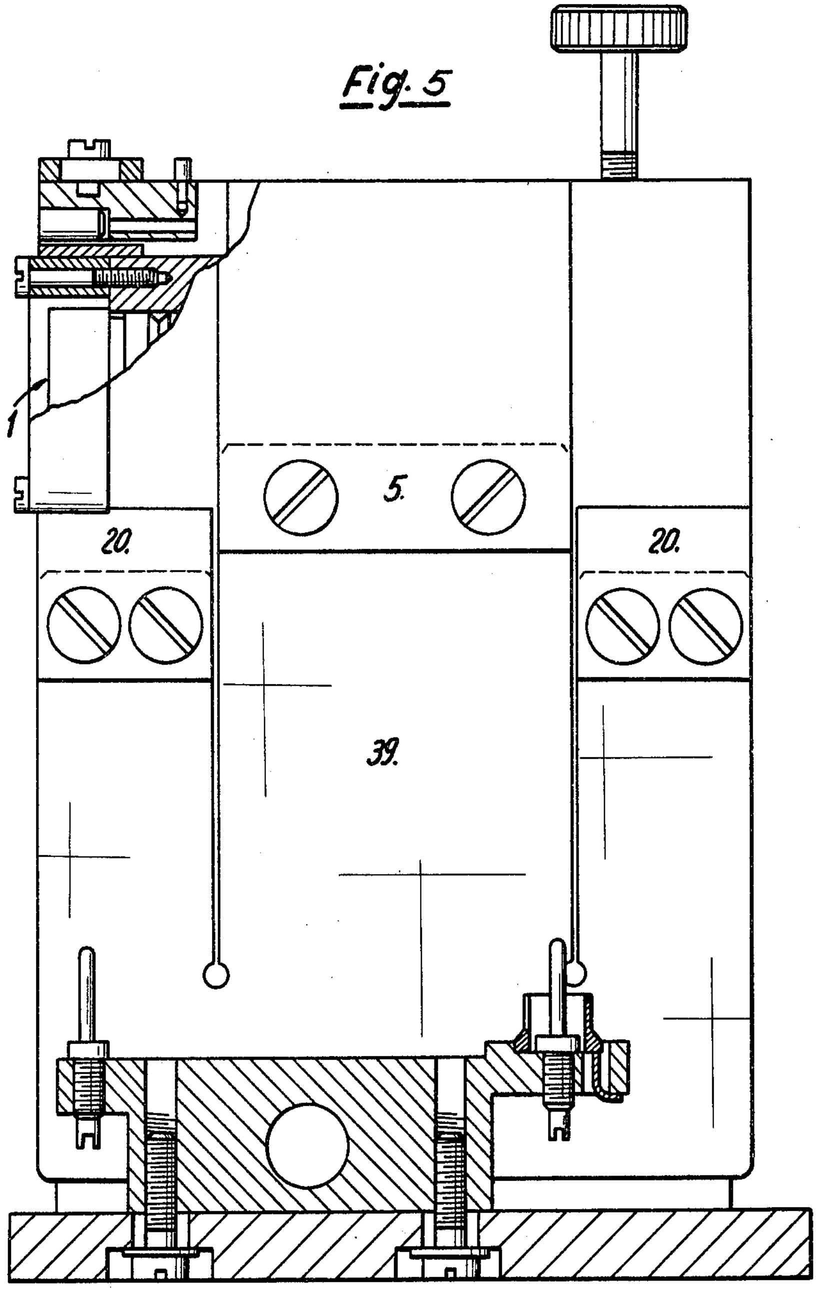
Figure 6:
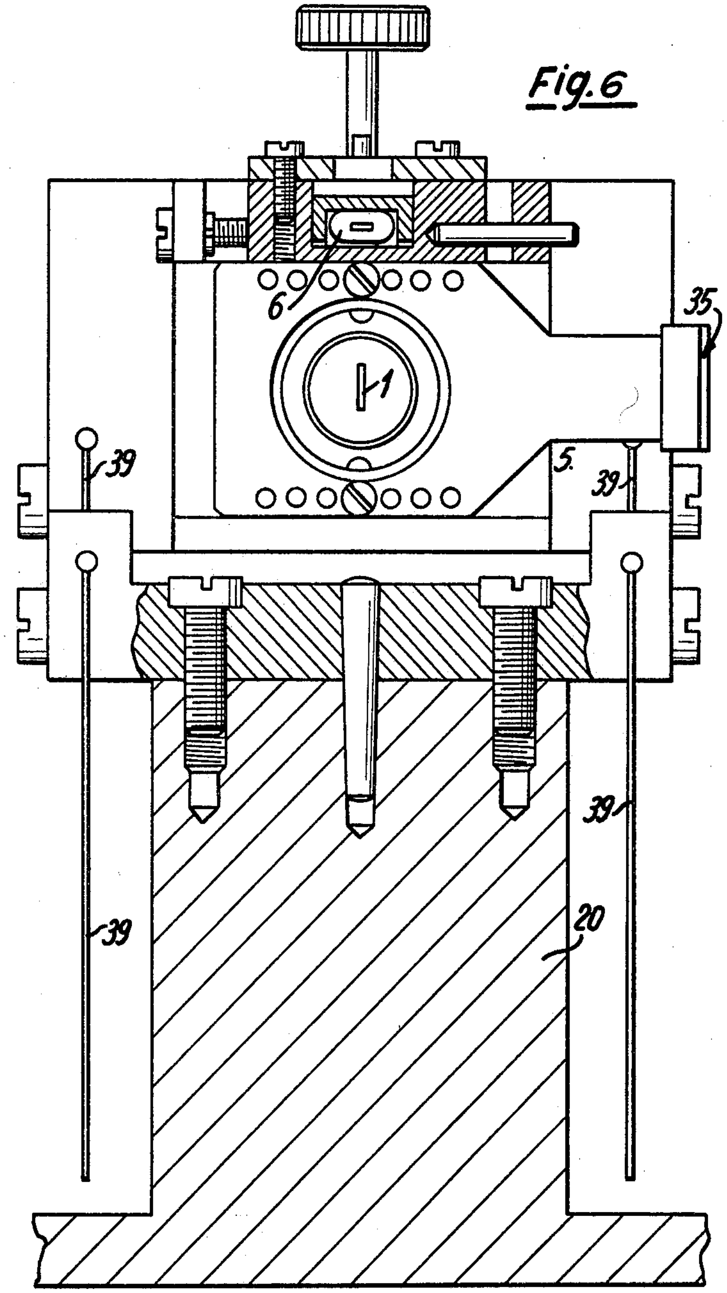
Figure 7:
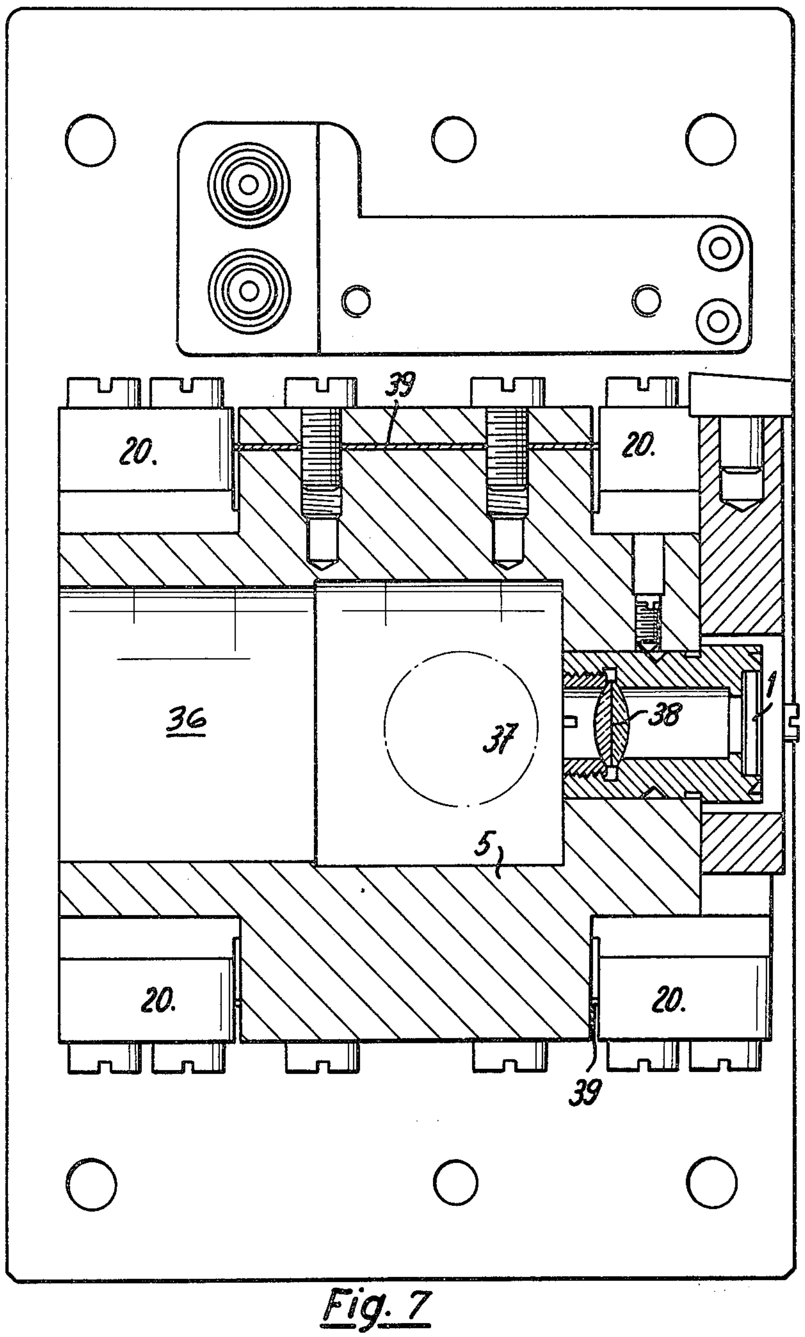
Figure 8:
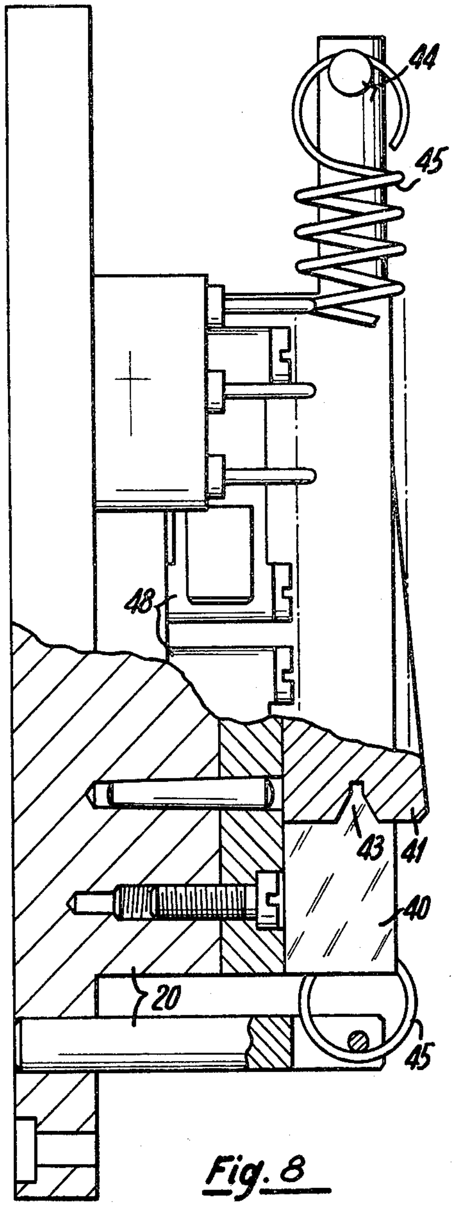
Figure 9:
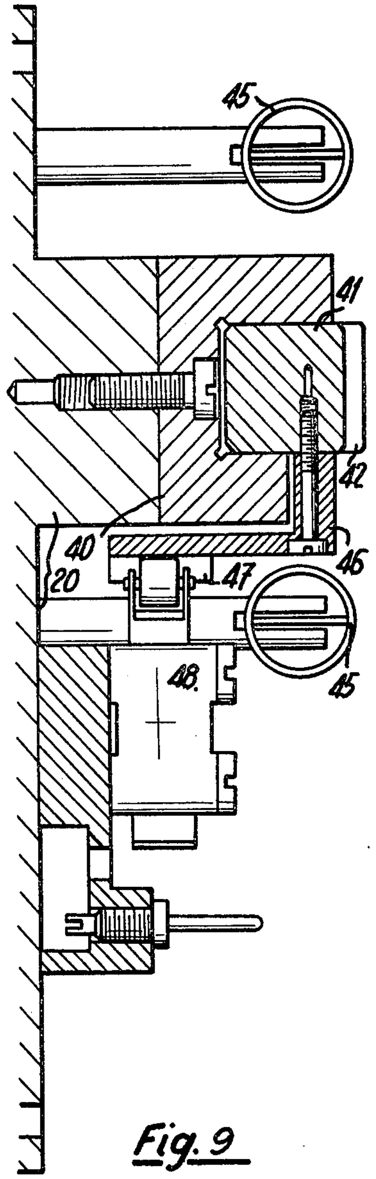
Figure 10:
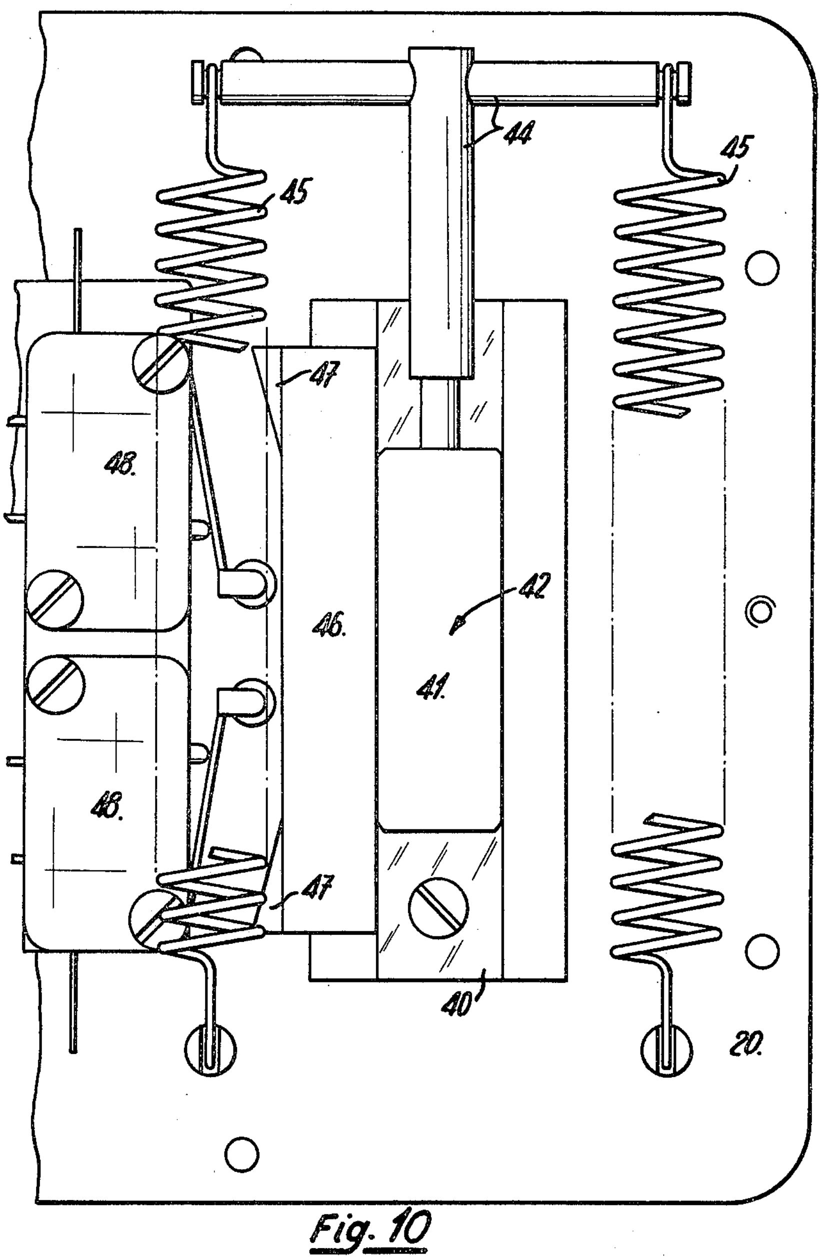
Figure 11:
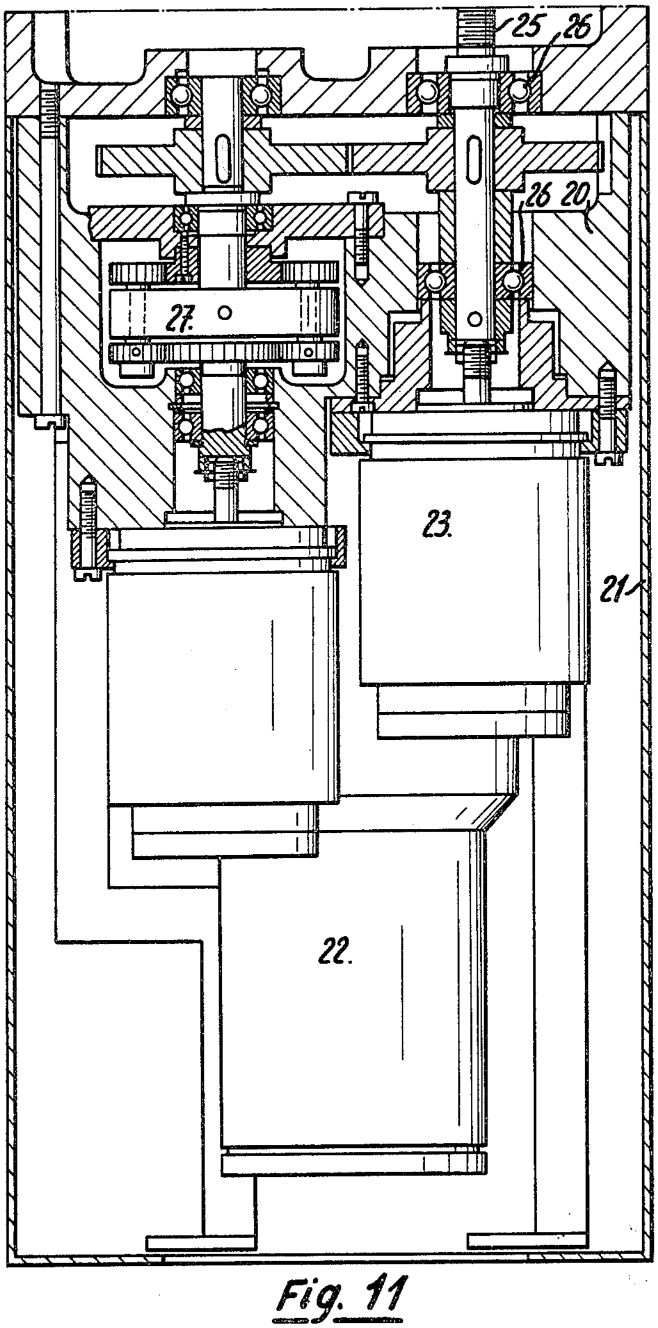
Figure 12:
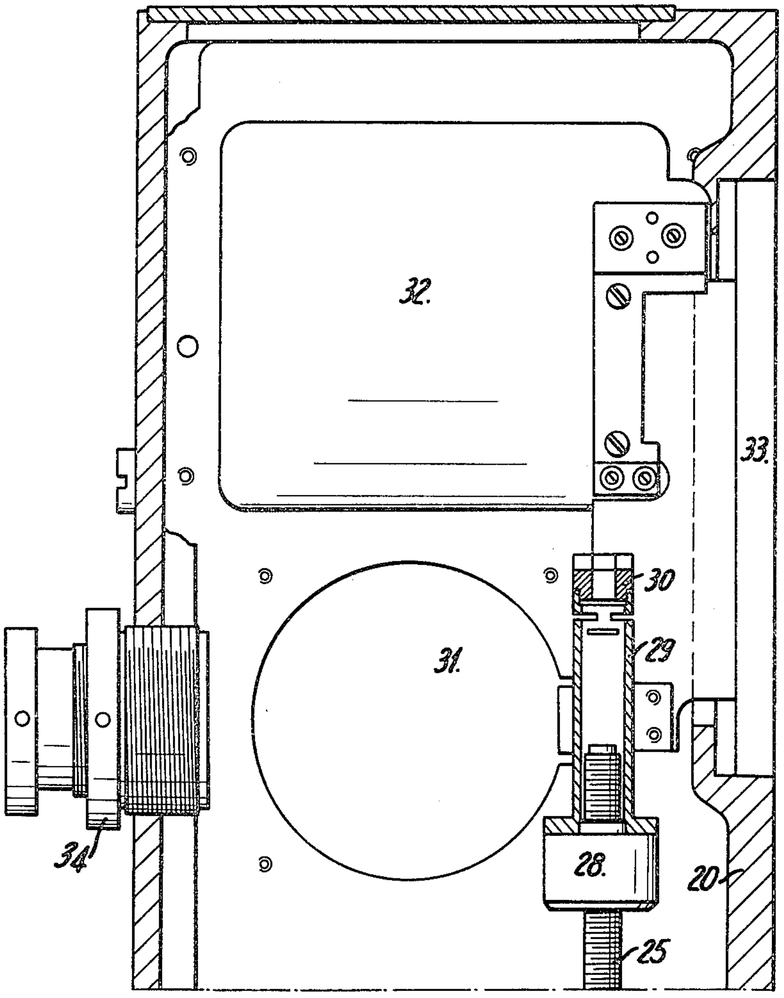

FIGURES 5 to 12 represent an embodiment of the photo-electric microscope, in which FIGURES 5 to 7 show a block carrying a light slot and a photo-electric cell seen respectively from the side, from the face and from the top, FIGURES 8 to 10 show an actuating device from the side, respectively from the front and from above, whereas FIGURES 11 and 12 represent a general top view of the frame on which the photo-electric microscope is mounted.

Figure 13:
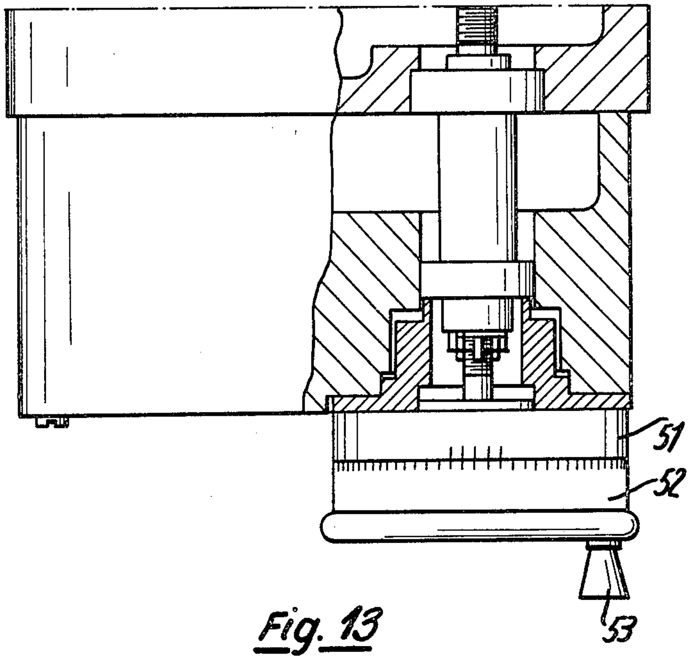

FIGURE 13 is a variant form of the embodiment shown in FIGURES 5 to 12.

The photo-electric microscope described and shown in the present application comprises as the existing photo-electric microscopes, an optical sighting device, a deflector which oscillates pariodically an optical axis on either side of a center position and a photo-electric cell receiving the pencil of rays reflected by the graduated surface of a precision ruler and controlling an electronic device indicating the relative position between a one of the precision graduations and the center position of the said optical axis.

The object of the present invention being the optical part only of the photo-electric microscope, the electronic indication device will not be described here. This electronic indication device could be for example similar to the one described in the U.K. Patent No. 686,274.

The originality of the photo-electric microscope described and shown resides in the fact that the reflected pencil of rays is also subjected to the action of the deflector and that the optical paths of the incident and reflected pencils of rays have approximately the same length, so that, since the source of light is fixed or immobile, the spot reflected onto the photo-electric cell is also immobile, which permits to eliminating all the drawbacks inherent in the scanning of the photo-electric cell in the existing devices.

Figure 1:
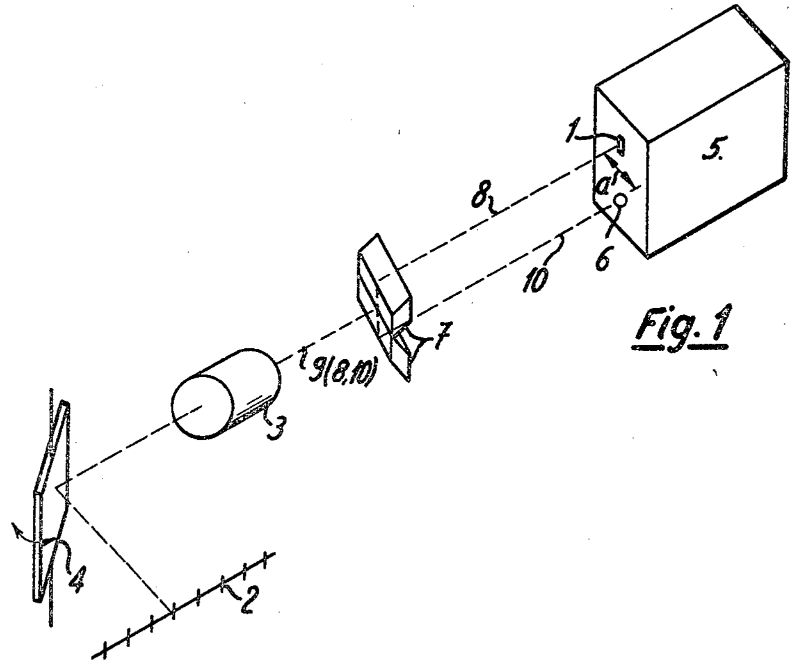

The first embodiment of the photo-electric microscope illustrated in FIGURE 1 comprises an optical sighting device which includes a light source and a condenser (not illustrated) illuminating slot 1. This device emits a pencil of rays which is projected onto a graduated precision ruler 2 through an objective 3. Between this objective 3 and the precision ruler 2 a deflector 4 is located which gives to the reflected image of the slot 1 a reciprocating movement along a portion of the graduated ruler 2. This deflector 4 is constituted by a mirror oscillating periodically past a central rest position. Such deflectors are now well known and therefore it will not be described in more detail here.

Between the objective 3 and a block 5 carrying the slot 1 as well as a photo-electric cell 6, a separator 7 is disposed permitting to separating the incident from the reflected pencil of rays which traverse the objective 3 along the same optical axis. This separator 7 is constituted by two juxtaposed rhombohedral prisms.

The slot 1 and cell 6 carried by block 5, the separator 7, the objective 3 and the deflector 4 are mounted on a frame displaceable along the graduated ruler 2. The working of the photo-electric microscope described is as follows:

The incident pencil of rays 8 emitted by the slot 1 is displaced parallelly to itself by one of the prisms of the separator a distance determined by the dimensions of this prism so that it coincides with the optical axis 9 of the objective 3. This incident pencil of rays traverses the objective, then reaches the deflector 4 which gives it a scanning movement around a center position and directs it onto the surface of the graduated ruler 2.

The reflected pencil of rays 10 which is the reflection from the ruler 2 of the incident pencil of rays follows the same optical path as the incident pencil of rays 8 until the separator 7. The second prism of this separator 7 causes a parallel spacing of the reflected pencil of rays 10, of a value determined by the dimensions of this prism, in order to separate the incident pencil of rays from the reflected pencil of rays which traverse the objective along the same optical axis. Practice has shown that it is preferable to place this separator in the immediate vicinity of the objective. This reflected pencil of rays is thus directed onto the photo-electric cell 6 disposed near the slot 1.

The reflected pencil of rays 10 is thus also subjected to the action of the deflector 4, so that this pencil of rays 10 traverses the objective along the same immobile optical axis 9 as the incident pencil of rays but in the reverse direction. Thanks to the fact that both the incident and reflected pencil of rays are subjected to the action of the deflector and that the length of the optical paths, with respect to this deflector, of the said incident and reflected pencil of rays are almost identical, the immobile reflected pencil of rays falls onto the photo-electric cell 6, so that all the drawbacks of scanning the said cell are eliminated.

The electric pulses obtained through the variations of illuminating intensity of the reflected pencil of rays falling on the photo-electric cell 6 are treated for example in the manner described in the U.K. Patent No. 686,274 in order to form the indication of the relative position between one of the graduations 2 and the center position of the oscillating optical axis.

It has further to be noted here that the position of the deflector 4, located betwen the objective 3 and the ruler 2, is particularly favourable since it permits the obtaining of immobile incident and reflected pencils of rays traversing this objective along its optical axis.

It has also to be noted that in order to obtain a position indication which will be linearly proportional, the portion of the scanning sinusoid used has to be assimilated to a straight line. This reduces the field in which measures can be effected through the photo-electric microscope. However, this measuring field may be easily increased. In fact, thanks to the symmetry of the incident and reflected pencils of rays, a translation of the slot 1 and cell 6 carrying block 5 parallely to itself in a direction *a*, perpendicular to the pencil of rays 8, 10 and to the pivoting axis *b* of the deflector, causes a displacement along the ruler 2, of the center position of the optical axis.

Figures 2, 4:
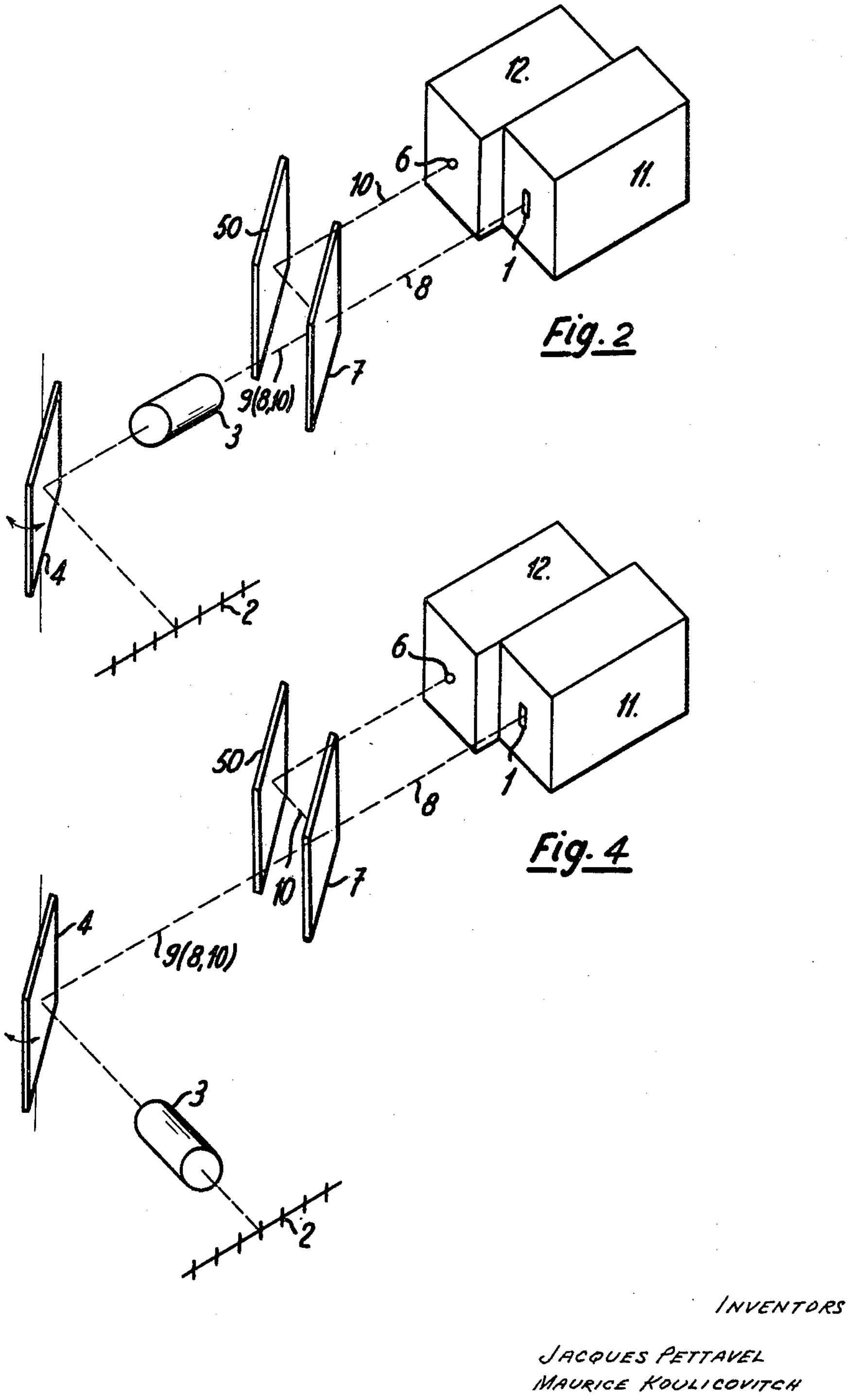

The second embodiment of the photo-electric microscope illustrated in FIGURE 2 is similar to the one illustrated in FIGURE 2. However, in this new embodiment, the reflected pencil of rays 10 is diverted after the separator 7 by means of a mirror 50, so that the block 12 carrying the photo-electric cell 6 may be juxtaposed to the block 11 carrying the slot. These two blocks 11 and 12 may then form only one element. It is to be noted however that the slot 1 and the cell 6 are not disposed in the same plane. In fact, the cell 6 is situated in a plane which is nearer to the separator so that the optical paths, with respect to the deflector 4, of the incident 8 and reflected 10 pencils of rays will be of the same length or approximately of the same length.

Figure 3:
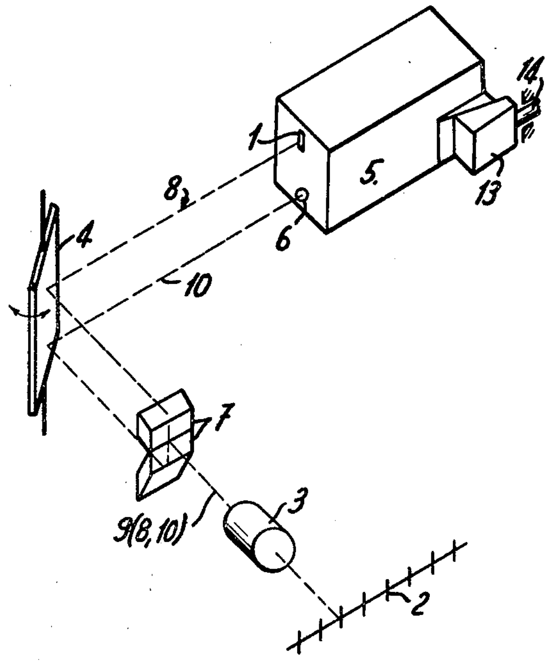

The third embodiment of the photo-electric microscope, illustrated at FIGURE 3, is identical to the one illustrated in FIGURE 1 but for the sequence in which the separator, the deflector and the objective follow each other.

It is to be noted that this embodiment, in which the separator 7 is located between the deflector 4 and the objective 3, this latter being disposed opposite the graduated ruler 2, is somewhat less advantageous due to the fact that the incident 8 and reflected 10 pencils of rays are not always coincident with the optical axis of the objective.

This embodiment comprises a device for transversely displacing the block 5 carrying the slot 1 and the cell 6 which enables a broadening of the measuring field of the photo-electric microscope. This transverse displacement device comprises a wedge 13, actuated by means of a screw 14, guided in slides of a frame and the working face of which cooperates with a face of the block 5. In this manner, an axial displacement of the wedge 13 causes a modification of the position of the block 5. In order to determine with precision the position of the block 5, the screw 14 is actuated by means of a micrometer (not illustrated).

The fourth embodiment of the photo-electric microscope shown in FIGURE 4 is similar to the second shown at FIGURE 2, the positions of the objective 3 and of the deflector 4 having been interchanged.

It is evident that the separator used in the first and third embodiments, could, in variants, be replaced by the separator used in the second and fourth embodiments and vice versa.

Further, in variants, the deflector shown in FIGURES 1 to 4 could be replaced by a deflector formed by a glass slide having parallel plan surfaces oscillating around an axis, or by an assembly of two parallel plan mirrors oscillating around an axis.

It is evident that the variants shown in FIGURES 1, 2 and 4 could be equipped, as is the case for the variant illustrated at FIGURE 3 with a device for displacing transversely the slot 1 and the cell 6.

It is obvious that the relative positions of the separator, of the deflector and of the objective may be permutated at will. In the case where the objective is located between the luminous source and the separator, this objective has to be double, two lens systems of parallel axes for example, due to the fact that the optical axis of the incident and reflected pencils of rays are not coincident on their way through the objective.

FIGURES 5 to 12 show one particular embodiment of the photo-electric microscope shown at FIGURE 2.

FIGURES 11 and 12 show each one part of a general plan view of the photo-electric microscope as it appears when mounted on a machine-tool. The FIGURE 11 shows more particularly a control device which is mounted on a frame 20 inside a casing 21 comprising a motor-generator set 22 intended to drive the precision screw 25 in rotation and which is controlled by a fine synchro 23 and a coarse synchro 24. The rotor of the fine synchro 23 is mechanically connected to precision screw 25 pivoted in bearings 26 on the frame 20 whereas the rotor of the coarse synchro 24 is also mechanically connected to said screw, but through the intermediary of a gear reducer 27. This control device permits to positioning by means of a control, the precision screw 25 in a desired angular position.

As will be seen later on, the position of said screw 25 determines the position of the block 5 carrying the slot 1 and the cell 6. However, as this control device is well known, it will not be described in further detail here.

It is evident that the photo-electric microscope which is described could also equip a measuring machine, in which case the precision screw 25 is actuated so as to locate the optical sighting axis of the photo-electric microscope as near as possible, inside the measuring field of said microscope, to the location to be measured, the indication of the photo-electric microscope giving then an indication relative to the spacing between the position of its optical sighting axis and the position to be measured.

FIGURE 13 shows a variant in which the precision screw is controlled by means of a micrometer comprising a nonius 51 carried by the frame 20, a drum 52 driven in rotation by means of a crank 53 the axis of which is connected to the screw 25 for its driving in rotation. Such an actuating device of the screw 25 may be used either on a measuring machine or on a machine-tool. It goes without saying that the driving of the screw 25 may be made automatic by using known techniques, as is the case for example in the embodiment illustrated in FIGURE 11.

FIGURE 12 shows more particularly the photo-electric microscope or locations provided on the frame 20 and intended for the fixing of the elements of the photo-electric microscope.

The free end of the precision screw 25 is in mesh with a nut 28 carrying an extension 29 provided at its free extremity with the male part 30 of a screw-driver coupling. This screw-driver coupling is intended, as will be seen later on, to drive a wedge of the actuating device of the block which carries the slot and the cell.

The frame 20 comprises a first location 31 intended to receive the deflector 4 of the photo-electric microscope, a second location 32 intended to receive the block 5 carrying the slot 1 and the cell 6 and a third location 33 intended to receive the actuating device of the block 5 for its transverse displacements. This frame 20 presents further a threaded boss 34 inside which the objective 3 and the separator 7 of the photo-electric microscope are mounted.

The deflector assembly 4 will not be described here in detail, since it is well known.

FIGURES 5 to 7 show the mounting on the frame 20 at the location 32 of the assembly of the block 5 carrying the slot 1 and the cell 6. The noteworthiness of this assembly of the block 5 resides on the one hand in the fact that it comprises an actuating surface 35 intended to cooperate with the actuating device for the transverse displacement of the block 5 and on the other hand in its mounting on the frame 20.

The block 5 comprises a cavity 36 inside which is located a luminous source 37 the rays of which, before coming out of the block 5, are concentrated by means of a condenser 38 on the slot 1.

This block 5 is mounted on the frame 20 through the intermediary of two spring blades having the shape of a E, 39. In fact, the block 5 is rigidly fixed on the center portion of the blades 39, whereas the lateral portions of these blades 39 are rigidly fixed on the frame 20. This mounting enables obtaining for small amplitudes, a linear displacement perpendicular to the plane of the blades of the block 5 with respect to the frame 20.

FIGURES 8 to 10 show the actuating device of the block 5 in its transverse displacements, that is to say perpendicularly to the plane defined by the incident 8 and reflected 10 pencils of rays, intended to be mounted on the frame 20 at the location 33. This device comprises a slide 40 fixed on the frame 20 inside which a wedge 41 is displaceable. This wedge comprises an upper active surface 42 in contact with the actuating surface 35 carried by the block 5. One of the ends of the wedge 41 presents a female part 43 of the screw-driver coupling, in which is housed the male part 30 fast with the nut 28 meshing with the precision screw 25. The other extremity of this wedge carries a T shaped part 44 connected to the frame 20 by means of two springs 45.

The position of the wedge 41 is thus determined by the position of the screw 25 with the screw-driver 30 of which it is constantly maintained in contact with the aid of the spring 45. The conicity of the wedge is low so as to realize a demultiplication of the order of 1 to 20 between its axial displacements, and thus those of the screw, and the transverse displacements of the block 5. This enables further positioning the block 5 with a very great precision, at least equal to the reading precision of the photo-electric microscope.

This wedge 41 carries further a part 46 provided with cams 47 cooperating with end stroke micro-switches 48 for stopping the driving of the screw 25 when the wedge 49 reaches one of its end stroke positions.

The operation of this embodiment of the photo-electric microscope is identical to that of the embodiment of FIGURE 2.

Several embodiments have been described schematically and by way of example, but it is obvious that numerous variants could be provided without departing from the scope of the present invention.

We claim:

1. A photoelectric arrangement for indicating the position of graduations, the arrangement comprising an optical device including a light source, a deflector arranged to oscillate a light beam emitted by the light source so as to illuminate graduations on either side of a central optical axis, a photo-electric cell arranged to receive the light beam reflected from the graduations by way of the deflector, the lengths of the optical paths for light passing from the source to the deflector and from the deflector to the photoelectric cell being such that the light falling on the photoelectric cell always falls on substantially the same region of the photoelectric cell, and means simultaneously to move the light source and the photo-electric cell transverse to the paths of the light respectively emitted and received thereby, so as to vary the position of the optical axis relative to the graduations.

2. An arrangement according to claim 1, wherein said light source and said photoelectric cell are mounted in a common support and said means comprises wedge means controlled by a micrometer screw to move said support.

3. An arrangement according to claim 1, including a beam splitter to separate the light beam emitted by the source and the reflected light beam received by the photoelectric cell.

4. An arrangement according to claim 3 wherein the light beam reflected by a semi-transparent mirror constituting the beam splitter is reflected by a further mirror into a path parallel to that of the light beam transmitted by the semi-transparent mirrors, and said source and photoelectric cells are disposed in different planes so that the lengths of said optical paths between the deflector and the source and the photoelectric cell are the same.

References Cited

UNITED STATES PATENTS

| | | | |
|---|---|---|---|
| 3,042,804 | 7/1962 | Koulikovitch | 250—206 |
| 3,205,768 | 9/1965 | Coombs et al. | 250—230 X |

RALPH G. NILSON, Primary Examiner

T. N. GRIGSBY, Assistant Examiner

U.S. Cl. X.R.

250—230, 234, 235